Patented July 1, 1930

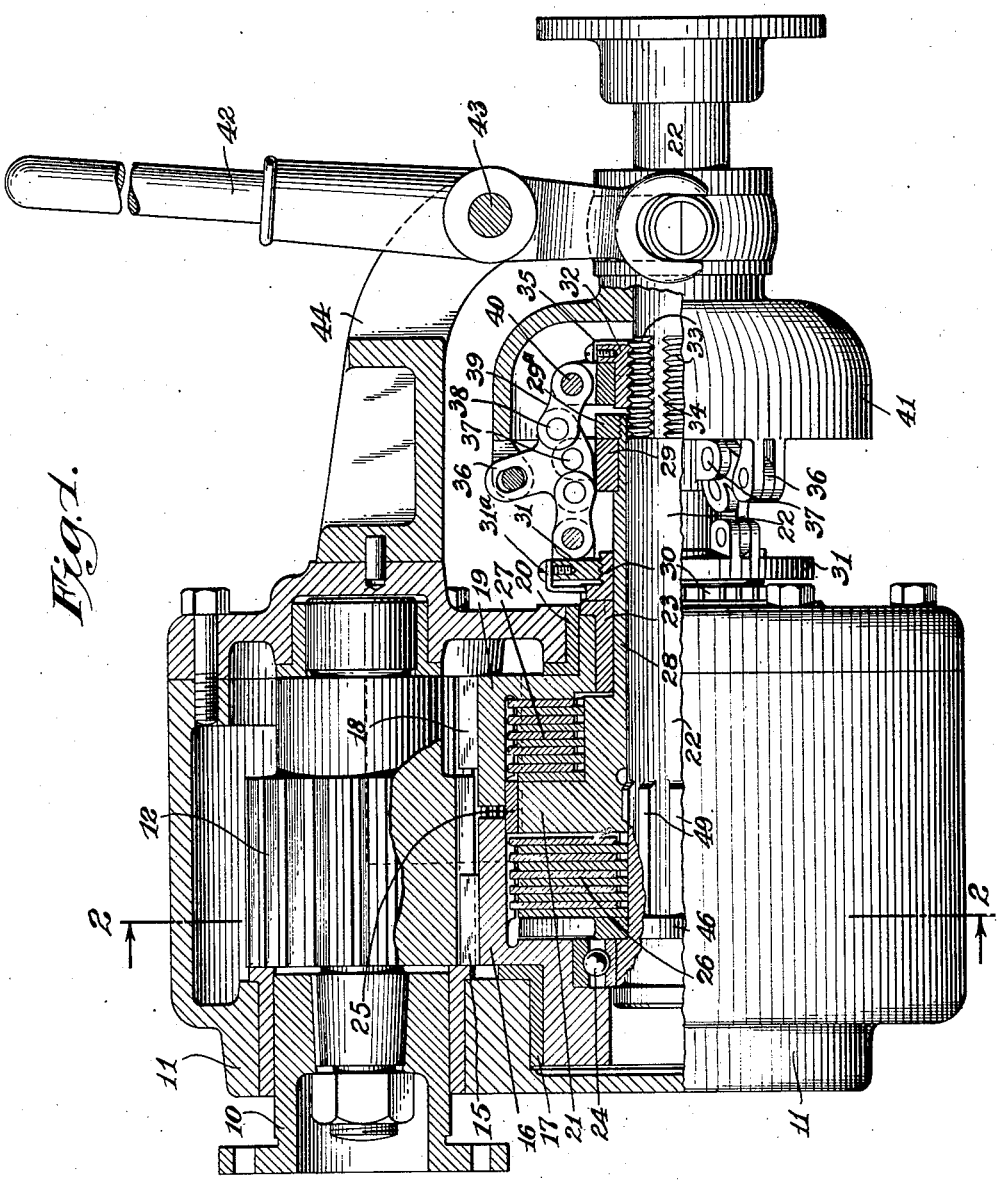

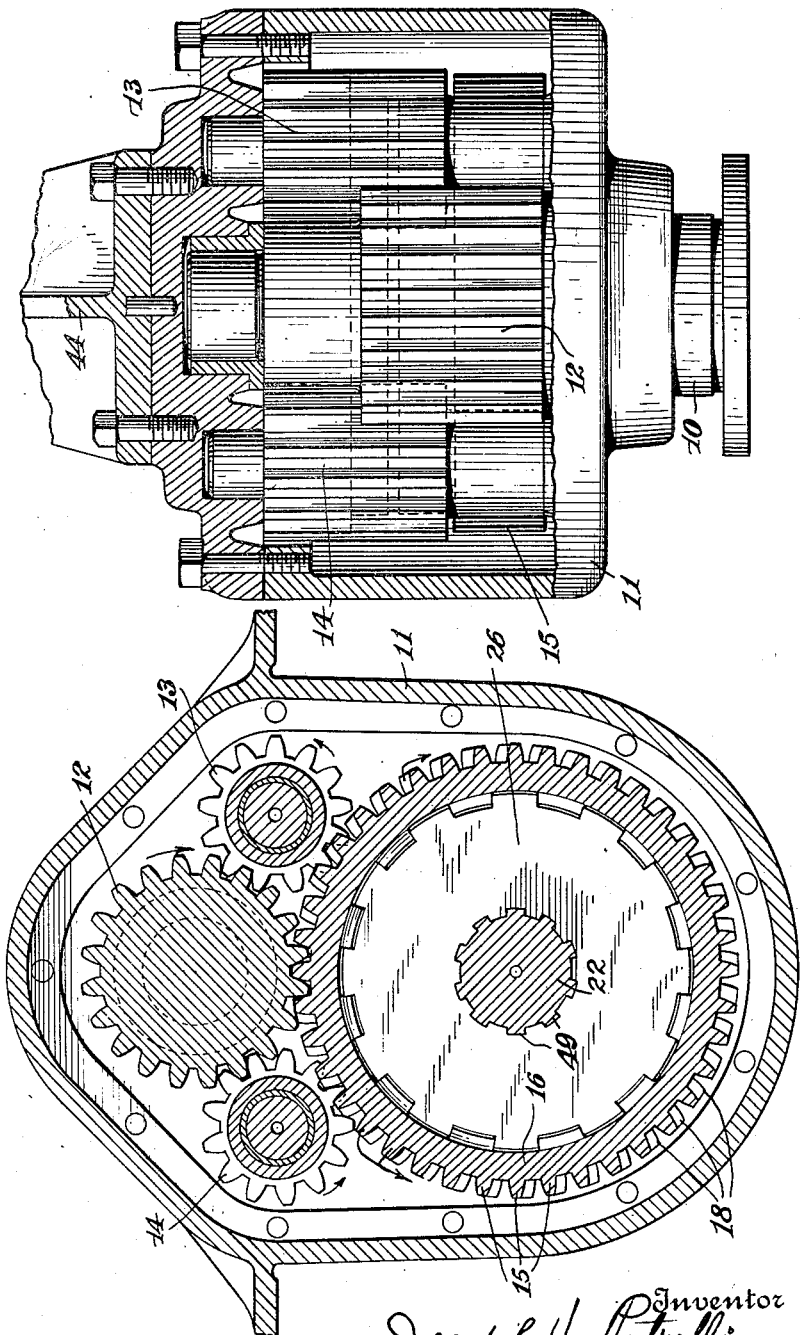

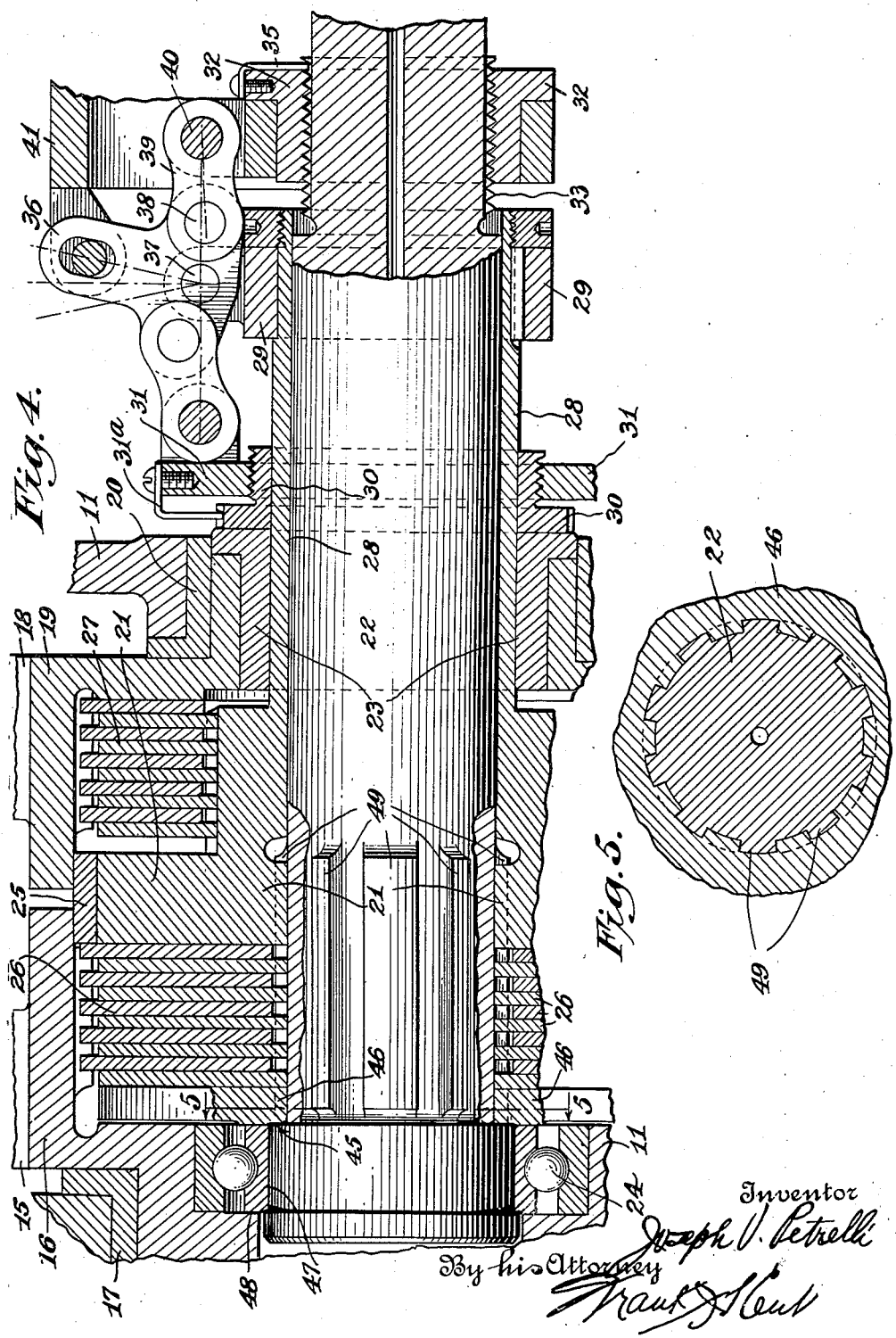

1,768,859

UNITED STATES PATENT OFFICE

JOSEPH V. PETRELLI, OF NEW ROCHELLE, NEW YORK

COMBINED REVERSE AND REDUCTION GEAR

Application filed April 9, 1928. Serial No. 268,784.

This invention relates to a combined reversing gear and clutch and has for its object to provide a device of this class which is simple to construct, of long life, and easy to maintain in adjustment. Another object is to combine these features in a reducing gear built into a combined reversing gear and clutch.

According to this invention a reduction gear is provided adjacent a combined reversing mechanism and clutch so that actuation of the clutch controls both rotation of the driven shaft and its direction of rotation. A housing is provided around the reduction gear, reversing gear, and clutch, while outside the housing is provided means for adjusting the pressure applied to the movable clutch part in operative position. There is no unbalanced axial thrust on any of the moving parts which may be transmitted to the housing or cause any unnecessary friction.

Referring to the drawings:

Fig. 1 shows this invention embodied in a compact device for marine application;

Fig. 2 is a section on the line 2—2 of Fig. 1;

Fig. 3 is a top plan view of the device of Fig. 2 with the top of the housing removed;

Fig. 4 is an enlarged longitudinal section corresponding to Fig. 1 but with the shiftable clutch part in a different position;

Fig. 5 is a section through the shaft and shiftable clutch part to illustrate the way in which said clutch part is splined on the shaft.

A driving shaft 10 is connected to the engine or motor in the usual manner before it enters the housing 11 within which it is journalled in the manner illustrated. On the driving shaft is located a gear 12 meshing with gears 13 and 14 as shown in Figs. 2 and 3. Gear 12 also engages the teeth 15 on the clutch member 16 shown in Figs. 1 and 4 while the gears 13 and 14 mesh with teeth 18 on the clutch member 19 simultaneously rotating in an opposite direction to clutch member 16. Bearings 17 and 20 are provided for the clutch members 16 and 19 respectively. Within the clutch members is arranged a shiftable clutch part 21 splined onto the driven shaft 22 which may be connected to the propeller or other device being driven. Within the clutch member 19 the shiftable clutch part 21 and its extension 28 are journalled in the bearing 23 which also supports the shaft 22 on account of the other end of the shaft being mounted within the ball bearing 24. To assist in supporting the clutch members 16 and 19 bearing metal 25 is provided around the periphery of the shiftable clutch part. On one side of this clutch part 21 is provided a set of friction discs 26 and on the opposite side another set of friction discs 27. In each set of discs alternate ones are splined to the shiftable clutch part and to the adjacent clutch members as illustrated in Figs. 1 and 4.

Outside the housing the clutch part extension 28 is provided with a thrust member 29 keyed thereon and held in place by a shoulder on the extension engaging one side of the thrust member and a nut 29$^a$ threaded on the extension for clamping the thrust member against said shoulder. Contiguous the bearing metal 23 and clutch member 19 is a thrust collar 30 slidable on the extension 28 and provided with a nut 31 threaded thereon, the nut being preferably locked in place with respect to the thrust collar 30 by a key 31$^a$ or other locking means. Engaging the threads 33 on the shaft 22 is the thrust nut 32 provided with a key 35 or other locking means engaging the slot 34 in the threads so as to prevent rotation between the shaft 22 and nut 32. Pivoted at 37 on the thrust member 29 is the lever 36 having the links 39 pivoted thereto at 38, said link being also pivoted at 40 to the thrust nut 32. The slidable bell-shaped sleeve 41 engages the outer ends of the several levers 36 and rocks said levers as said sleeve is shifted by the actuating handle 42 pivoted at 43 to a support 44 secured to the housing. A similar link arrangement is provided on the opposite side of the lever 36 and connected to the nut 31. When the actuating sleeve 41 is moved to the right lever 36 is rotated until the center of the pivot 38 lies below a line joining the centers of the pivots 37 and 40 whereby a toggle joint is provided. The engagement of the link 39 with the top of the thrust member 29 or its securing nut prevents further clockwise rotation of the lever 36. Rotating the lever in the opposite direction raises the pivot 38 and releases the toggle from the pressure applied between the thrust member 29 and the nut 32. When the toggle on the left side of the lever 36 in Fig. 4 is actuated the shiftable clutch part 21 is pressed against the discs 27 by the thrust member 29 and the pressure transmitted through the thrust nut 31 to the thrust collar 30, bearing member 23 and clutch member 19 so that there is no unbalanced thrust on this member or housing which might cause unnecessary friction.

On the left end of the shaft as shown in Fig. 4 is provided a shoulder 45 which retains the thrust collar 46 in place on the shaft, this collar being splined to the shaft by the ribs 49. To increase the holding power of the shoulder 45 an additional shoulder 48 is provided on the shaft 22 which tightly clamps the lower ball race 47 between the thrust collar 46 and the shoulder 48. On movement of the shiftable clutch part 21 to the left the discs 26 are compressed against the thrust collar 46, the pressure being transmitted through the extension 28 to the thrust member 29 and through the shaft 22 to the thrust nut 32 so that no thrust is applied to the clutch member 16 or to the housing.

If it is found that one set of friction discs 26 or 27 has worn more than the other set the toggles illustrated would not be capable of applying sufficient pressure to the worn discs. In such a case if for example the discs 26 had become worn it would be necessary to release the lock 35 of the nut 32 and with the toggle joints between the thrust member 29 and the nut 32 in a closed position, the nut 32 is rotated with the result that additional pressure is applied to the discs 26 between the thrust collar 46 and shiftable clutch part 21. When sufficient pressure has been applied the thrust nut 32 is locked in position and the device is ready to operate. Of course, if enough pressure can not be applied with the toggles closed they may be opened and a slight movement imparted to the nut but in such case care must be taken to see that no excessively large clamp stress is provided which might unduly wear the discs or cause breakage of some parts. The set 26 of discs is used for the forward or reverse direction of the propeller according to direction rotation of the engine or motor on the driving shaft 10.

The reversing gear illustrated is adapted for general use although especially useful in marine work but it will be obvious that this reversing gear may be used either with or without the reducing mechanism shown.

I claim:

1. The combination with a driving shaft, of a driven shaft, means comprising clutch members between said shafts for driving the second shaft at a different speed from the first, a reversing mechanism and clutch between said shafts, operating mechanism for actuating said clutch to control the rotation of the driven shaft and its direction, and means for adjusting said operating mechanism to vary the operating pressure on said clutch part when engaged with either clutch member without affecting the pressure on said part when engaged with the opposite clutch member.

2. The combination with a driving shaft, of a driven shaft, simultaneously oppositely rotating clutch members between said shafts, a clutch part between said members, operating mechanism for moving said clutch part into cooperation with either of said clutch members, and means for adjusting said operating mechanism to vary the operating pressure on said clutch part when engaged with either clutch member without affecting the pressure on said part when engaged with the opposite clutch member.

3. The combination with a driving shaft, of a driven shaft, simultaneously oppositely rotating clutch members between said shafts, a clutch part between said members, operating mechanism for moving said clutch part into cooperation with either of said clutch members, means for adjusting said operating mechanism to vary the operating pressure on said clutch part when engaged with one clutch member without affecting the pressure on said part when engaged with the opposite clutch member, and a housing enclosing said clutch members and clutch part, said pressure adjusting means being outside the housing.

4. The combination with a driving shaft, of a driven shaft, means comprising clutch members and a reducing gear between said shafts, a reversing mechanism and clutch contiguous said reducing gear, a housing for said reducing gear, reversing mechanism and clutch, operating mechanism for actuating said clutch to control rotation and the direction of rotation of said driven shaft, and means for adjusting said operating mechanism to vary the operating pressure on said clutch part when engaged with either clutch member without affecting the pressure on said part when engaged with the opposite clutch member.

5. The combination with oppositely rotating clutch members, of a clutch part between said members for engagement with either of them, an extension on said clutch part, a shaft passing through said extension, a thrust member on said extension, a thrust collar cooperating with the clutch member adjacent said thrust member, a thrust collar on said shaft and on the opposite side of said thrust member from the first thrust collar, and means for exerting pressure between said thrust member and either thrust collar.

6. The combination with oppositely rotating clutch members, of a clutch part between said members for engagement with either of them, an extension on said clutch part, a shaft passing through said extension, a thrust member on said extension, a thrust collar cooperating with the clutch member adjacent said thrust member, a thrust collar on said shaft and on the opposite side of said thrust member from the first thrust collar, means for exerting pressure between said thrust member and either thrust collar, and means for adjusting the position of either thrust collar with respect to the thrust member on said extension.

7. The combination with oppositely rotating clutch members, of a clutch part between said members for engagement with either of them, an extension on said clutch part, a shaft passing through said extension, a thrust member on said extension, a thrust collar cooperating with the clutch member adjacent said thrust member, a thrust collar on said shaft and on the opposite side of said thrust member from the first thrust collar, means for exerting pressure between said thrust member and either thrust collar, and means for adjusting the amount of pressure between said thrust member and either thrust collar independently of the adjustment of pressure between said thrust member and the other collar.

8. The combination with oppositely rotating clutch members, of a clutch part between said members for engagement with either of them, an extension on said clutch part, a shaft passing through said extension, a thrust member on said extension, a thrust collar cooperating with the clutch member adjacent said thrust member, a thrust collar on said shaft and on the opposite side of said thrust member from the first thrust collar, means for exerting pressure between said thrust member and either thrust collar, said last mentioned means including toggles between the thrust member and each thrust collar, and mechanism for actuating said toggles and shifting said extension.

9. The combination with a driving shaft, of simultaneously oppositely rotating clutch members driven thereby at a lower speed, gears between said shaft and clutch members, a shiftable clutch part passing through at least one of said clutch members, a housing enclosing said gears, clutch member and shiftable clutch part, operating mechanism for shifting said clutch part to engage either of said clutch members or be disconnected therefrom, and means for adjusting said operating mechanism to vary the operating pressure on said clutch part when engaged with either clutch member without affecting the pressure on said part when engaged with the opposite clutch member.

10. The combination with oppositely rotating clutch members, of a clutch part between said members for engagement with either of them, an extension on said clutch part, a shaft passing through said extension, a thrust member on said extension, a thrust collar cooperating with the clutch member adjacent said thrust member, a thrust collar on said shaft and on the opposite side of said thrust member from the first thrust collar, and means for exerting pressure between and thereby separating said thrust member and either thrust collar, and simultaneously pulling the thrust member and opposite thrust collar together.

11. The combination with oppositely rotating clutch members, of a clutch part between said members for engagement with either of them, an extension on said clutch part, a shaft passing through said extension, a thrust member on said extension, a thrust collar cooperating with the clutch member adjacent said thrust member, a thrust collar on said shaft and on the opposite side of said thrust member from the first thrust collar, and means for exerting pressure between said thrust member and either thrust collar, and for balancing axial thrusts and preventing transmission of any unbalanced thrusts to either clutch member.

12. The combination with a driving shaft, of simultaneously oppositely rotating clutch members driven thereby at a lower speed, gears between said shaft and clutch members, a shiftable clutch part passing through at least one of said clutch members, a housing enclosing said gears, clutch member and shiftable clutch part, means for shifting said clutch part to engage either clutch member and to apply pressure to said clutch part and means associated with said last mentioned means to prevent transmission of such pressure to the housing.

13. The combination with opposed clutch members, of a shiftable clutch part therebetween, an extension on said clutch part passing through one of said clutch members, a thrust nut cooperating with the clutch member through which said extension passes, a member passing through said clutch part and constructed to oppose thrust exerted by said part on the opposite clutch member, a thrust member on said extension, an adjustable nut adjacent said extension and on said member which passes through said clutch part, and means cooperating with said extension and with either thrust nut to apply pressure to said clutch part.

14. The combination with opposed clutch members, of a shiftable clutch part therebetween, an extension on said clutch part passing through one of said members, an adjustable thrust nut cooperating with said clutch member through which said extension passes, a shaft passing through said clutch members and having said clutch part and its extension slidably splined thereon, a set of friction discs on each side of said shiftable clutch part, alternate discs of each set being splined to their adjacent clutch member and to said clutch part, a thrust member on said extension, a thrust nut on said shaft adjacent said extension thrust member, a thrust collar on said shaft for opposing thrust on said clutch part and discs which tends to move said clutch part toward the clutch member opposite that through which said extension passes, and means engaging both thrust nuts and the extension thrust member for shifting said clutch part.

15. The combination with opposed clutch members, of a shiftable clutch part therebetween, an extension on said clutch part passing through one of said members, a shiftable thrust nut cooperating with said clutch member through which said extension passes, a shaft passing through said clutch members and having said clutch part and its extension slidably splined thereon, a set of friction discs on each side of said shiftable clutch part, alternate dics of each set being splined to their adjacent clutch member and to said clutch part, a thrust member on said extension, a thrust nut on said shaft adjacent said extension thrust member, a thrust collar on said shaft for opposing thrust on said clutch part and discs which tends to move said clutch part toward the clutch member opposite that through which said extension passes, and means engaging both thrust nuts and the extension thrust member for shifting said clutch part, one set of discs providing more friction area than the other set and bearing metal on the periphery of said clutch part for engaging the adjacent end portions of the clutch members.

16. The combination with a shaft, of a shiftable sleeve thereon, a shiftable extension also on said shaft, and pivotal means cooperating with said shaft, sleeve, and extension for applying a greater force tending to shift said extension than is applied to said sleeve, said means including toggle joints connected between said extension and shaft, one of said toggle joints exerting a toggle action to shift said extension in one direction relative to said shaft, and another of said toggle joints exerting a toggle action to shift said extension in the opposite direction relative to said shaft.

17. The combination with a shaft, of a shiftable sleeve thereon, a shiftable extension also on said shaft, and pivotal means cooperating with said shaft, sleeve, and extension for applying a greater force tending to shift said extension than is applied to said sleeve, said means including toggle joints connected between said extension and shaft, and means for adjusting said toggle joint connections to control the force applied to said extension by said sleeve, one of said toggle joints exerting a toggle action to shift said extension in one direction relative to said shaft, and another of said toggle joints exerting a toggle action to shift said extension in the opposite direction relative to said shaft.

18. The combination with a shaft, of a shiftable sleeve thereon, a shiftable extension also on said shaft, an abutment over said extension and fixed against shifting with respect to said shaft, an abutment nut threaded on said shaft, an inverted T-shaped lever pivoted adjacent the central portion thereof to said extension, a link pivoted to said abutment and one end portion of said lever and forming a toggle joint, means for limiting movement of said lever in each direction, another link pivoted to said abutment nut and connected to the opposite end portion of said lever and forming another toggle joint, and means connecting said sleeve with the outer end portion of said inverted T-shaped lever for actuating said lever and toggle joints from said sleeve.

In testimony whereof I affix my signature.

JOSEPH V. PETRELLI.